United States Patent [19]

Okada

[11] Patent Number: 4,687,981

[45] Date of Patent: Aug. 18, 1987

[54] STEPPING MOTOR

[75] Inventor: Kazuo Okada, Tokyo, Japan

[73] Assignee: Kabushiki Kaisha Universal, Tochigi, Japan

[21] Appl. No.: 843,664

[22] Filed: Mar. 25, 1986

[30] Foreign Application Priority Data

Mar. 25, 1985 [JP] Japan .............................. 60-41566[U]

[51] Int. Cl.⁴ .............................................. H02P 8/00
[52] U.S. Cl. ..................................... 318/696; 318/685
[58] Field of Search ................................ 318/696, 636; 273/143 R

[56] References Cited

U.S. PATENT DOCUMENTS 4,099,722 7/1978 Rodesch et al. ................. 273/143 R
4,534,560 8/1985 Okada .............................. 273/143 R Primary Examiner—William M. Shoop, Jr.
Assistant Examiner—Saul M. Bergmann
Attorney, Agent, or Firm—Young & Thompson

[57] ABSTRACT

A stepping motor having a rotary shaft carrying a rotor, a stator, a housing encasing the rotor and a part of the rotary shaft and supporting the stator, and a signal system comprising a signal member provided on the rotary shaft and a sensor so disposed on the housing as to detect the passage of the signal member to produce a signal each revolution of the rotary shaft. The signal member can be a radially extending lug on the rotary shaft or a disc on the rotary shaft with a hole through the disc. The particular use is to detect the rotated position of a slot machine reel that has a series of various symbols on its periphery and is mounted on and rotated by the shaft; and for this purpose, the free end of the shaft and the reel mounted thereon have non-circular interengaging structure that accurately predetermines the relative positions of the signal member and the various symbols on the reel.

10 Claims, 3 Drawing Figures

STEPPING MOTOR

BACKGROUND OF THE INVENTION

The present invention relates to a stepping motor and more particularly to a stepping motor which is adapted to detect one revolution of the motor shaft thereof.

As is well known in the art, the rotor of a stepping motor makes an equiangular revolution per driving pulse. Theoretically, therefore, the total angle of revolution of the rotor can be absolutely determined based on the angle of revolution per driving pulse and the total number of driving pulses applied.

In fact, however, there is occasionally a loss of synchronism, namely, a discrepancy between the actual angular revolution of the rotor and the number of driving pulses applied to the stepping motor. Because of such loss of synchronism, it is difficult to determine accurately the angular position of the rotating rotor at any given moment.

One of the measures generally taken against such difficulty in stepping motors is to provide a counter which is adapted to count driving pulses applied to the stepping motor and to be reset to its initial value every one revolution of the rotor under the influence of a reset pulse. To this end, the stepping motor is adapted to produce a reset pulse for resetting the counter every one revolution of the rotor. As a result of the provision of the counter, the fraction of revolution less than one full revolution of the rotor can be determined based on the counted value of the counter and, on the other hand, the number of revolutions is equal to the number of reset pulses. Consequently, the angular position of the rotating rotor at any moment can be easily determined based on the counted value of the counter. As will be apparent from the above, even if there is an asynchronous rotation during one revolution, the counted value which may include an error in angular position is reset every one revolution, thereby avoiding an accumulated error in angular position of the rotor. The provision of the above-described counter is contributive to the accurate determination of the number of revolutions of the rotor and/or the angular position of the rotating rotor.

To provide reset pulses, heretofore, a driven body coupled to the stepping motor has been provided with a light-opaque lug which is detected by a sensor such as a photosensor to produce a reset pulse every one revolution of the driven body. The provision of such a lug on the driven body involves the problem that the lug is apt to be damaged when assembling the driven body and mounting the assembled driven body on the rotor shaft of the stepping motor and that it is necessary to locate the sensor accurately at a predetermined position, and so a complicated assembling operation is required.

OBJECTS OF THE INVENTION

It is therefore an object of the present invention to provide a stepping motor in which means is provided for detecting each revolution of a rotary shaft of the stepping motor.

It is another object of the present invention to provide a stepping motor in which a revolution-detecting means is protected from damage when a driven body is coupled thereto.

It is still another object of the present invention to provide a stepping motor which makes it possible to build easily a revolution-detecting means therein.

SUMMARY OF THE INVENTION

For achieving the above-mentioned objects, the stepping motor in accordance with the present invention comprises a signal member provided on a part of a rotary shaft encased in a housing of the stepping motor and a sensor so disposed on said housing as to detect said signal member to produce one signal for every revolution of said rotary shaft.

According to a desirable embodiment of the stepping motor of the present invention, the signal member, which serves as a datum point of rotational angle of the rotary shaft, comprises an opaque lug or an opaque disk having a small hole which is detected by a photosensor disposed inside the housing upon passing thereby. The photosensor is adapted to produce for every detection of the signal member a signal pulse which in turn serves as a reset signal for resetting a counter which counts pulses applied to the stepping motor in order to identify the rotated angle of the rotary shaft.

The provision of the signal member inside the housing avoids damage to the signal member when a driven body is attached to the stepping motor and improves the assembling efficiency.

BRIEF DESCRIPTION OF THE DRAWINGS

The above-mentioned and other objects and features of the present invention will become more apparent upon consideration of the following description taken in connection with the accompanying drawings, in which:

FIG. 3 is a perspective view showing another embodiment of the stepping motor according to the present invention.

DETAILED DESCRIPTION OF THE INVENTION

Figure 1:
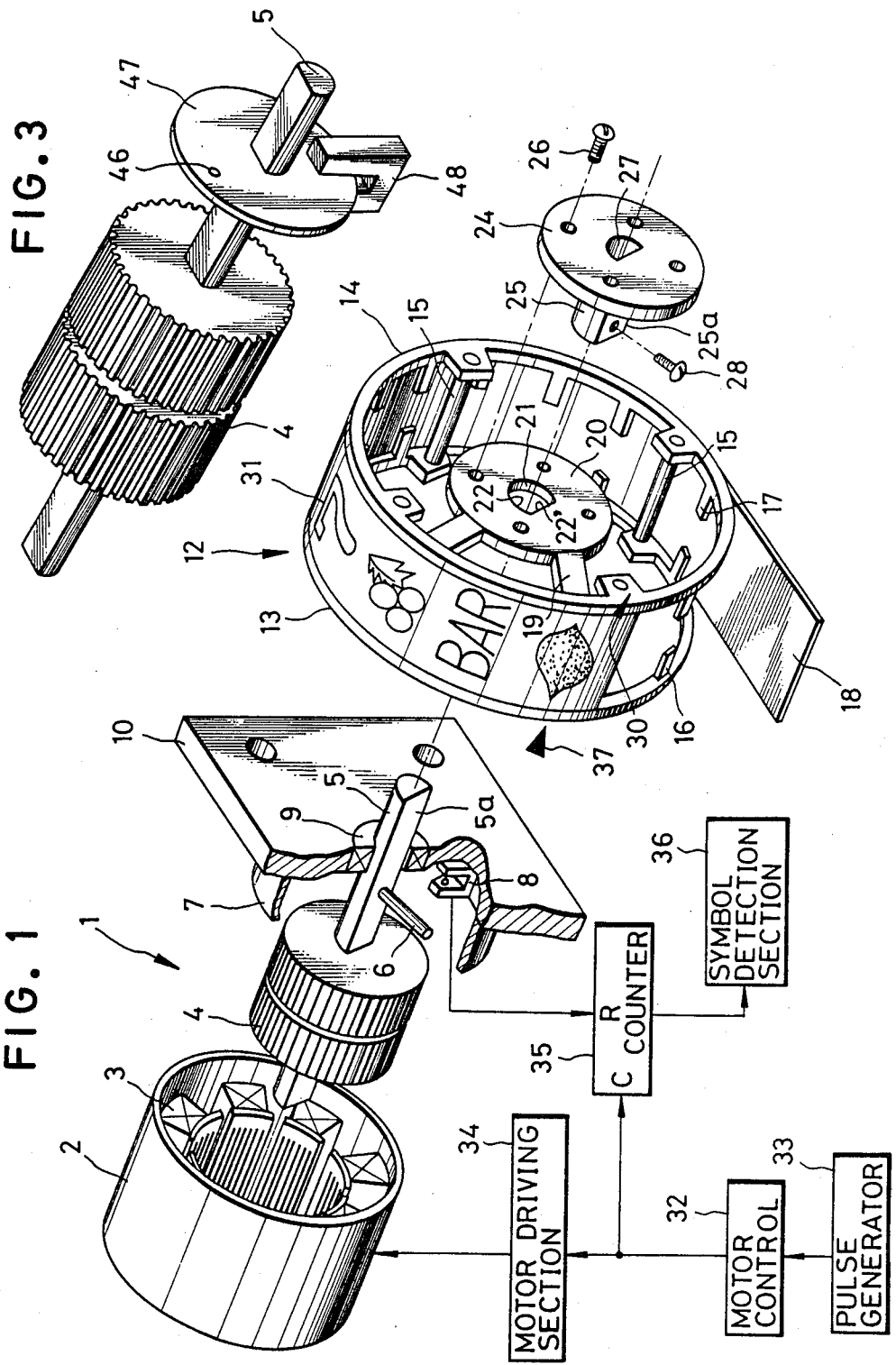
FIG. 1 is an exploded perspective view showing an embodiment of the stepping motor according to the present invention.

FIG. 1 shows an example of a stepping motor according to the present invention which is adapted to drive a reel of a slot machine. The stepping motor 1 comprises stators 3 spaced equally inside a cylindrical housing 2, each consisting of a core and a coil, and a rotor 4 comprised by a permanent magnet surrounded by the stators 3. The rotor 4 having its rotary shaft 5 formed integrally therewith is turned equiangularly when the stators 3 are successively energized by pulses.

The rotary shaft 5 is provided with an axially extending flat surface 5a from which an opaque lug 6 projects perpendicularly so as to turn with the rotary shaft 5. An inner cylindrical barrel 7 which is inserted inside the housing 2 has a photointerrupter 8 secured to its inner wall. This interrupter 8, which is, as is well known per se, comprised of a light-emitting part and a light-receiving part facing each other, can detect the lug 6 at the moment it passes therethrough. Designated by a numeral 9 is a bearing member disposed between the rotary shaft 5 and a base frame 10 holding the support barrel 7 thereon. It is possible to omit the inner barrel 7 by providing the photointerrupter 8 on the inside wall of the housing 2.

The rotary shaft 5 serves as a driving shaft on which a reel 12 of a slot machine is fixedly mounted for rotation. The reel 12 consists of two circular reel frames 13 and 14 each having axially extending short ribs 16 and 17 spaced from each other, connecting rods 15 for connecting the reel frames 13 and 14 with spacing therebetween, and a strip 18 attached around the ribs 16 and 17 which has various symbols on its periphery, all being made of plastic materials. One of the circular reel frames 13 and 14, for example the reel frame 13 in this embodiment, has a coupling plate 20 connected integrally therewith by a plurality of diagonal bridge members 19.

At the center of the coupling plate 20 an opening 21 defined by a semi-circular arc 22 and a straight edge 22' is formed for receiving a hollow shaft or sleeve 25 of a reinforcing member 24 which may be, for example, an aluminum die casting. The sleeve 25 has an outer contour having an axially extending flat surface 25a corresponding to the opening 21, so as to position the reinforcing member 24 in a specified orientation relative to the reel 12. The reinforcing member 24 is fixed to the coupling member 20 with set screws 26.

An opening 27 having a cross section corresponding to that of the rotary shaft 5 extends axially through the reinforcing member 24 and its sleeve 25. The rotary shaft 5 is inserted into the opening 27 and then fastened with a set screw 28, whereby the components of the reel 12 are integrally coupled to each other. On the side surface of one of the reel frames 13 and 14, for example the reel frame 14, there is an index mark 30 at a predetermined position relative to the straight edge 22' of the opening 21. The strip 18 with an annular series of various symbols 31 at regular intervals printed or formed otherwise thereon is attached to the reel frames 13 and 14 by the aid of the ribs 17 and 18 to maintain a predetermined relationship between the index mark 30 and the respective symbols 31. Consequently, there is ensured a predetermined positional relation between the lug 6 fixed to the rotary shaft 5 and the respective symbols 31 on the strip 18.

When motor control section 32 is actuated, driving pulses generated by the pulse generator 33 are supplied through the motor control section 32 to motor drive circuit 34, thereby driving the stepping motor 1. Simultaneously, the driving pulses are supplied through the motor control section 32 to a counter 35 and are counted thereby. As will be apparent, the value counted by the counter is the number of driving pulses supplied to the stepping motor 1, and so corresponds to the degree of rotation of the rotor 4, and hence the reel 12. The photointerrupter 8 produces reset pulses, one for each revolution of the rotor shaft 5, which reset the counter 35 to its initial value.

The motor control section 32 is rendered inactive by the impression of a stop signal thereon so as to stop the supply of pulses to the motor driven circuit 34 and the counter 35, thereby stopping the stepping motor 1. At this time, the counter 35 maintains its counted value, which means the number of pulses supplied to the stepping motor 1 during the last fractional revolution of the rotor 4, and hence the reel 12. In a symbol detection section 36, there is memorized a certain relation between the value counted by the counter 35 and the symbol codes corresponding to the respective symbols 31 on the reel 12, which are predetermined based on their position relative to the reference position where the above-mentioned reset pulse is produced by the photointerrupter 8. Therefore, while the stepping motor 1 and the reel 12 rotate, a symbol in a winning position, i.e. in registry with a mark 37, is identified by the symbol detection section 36 with reference to the count of the driving pulses in the counter 35.

Figure 2:
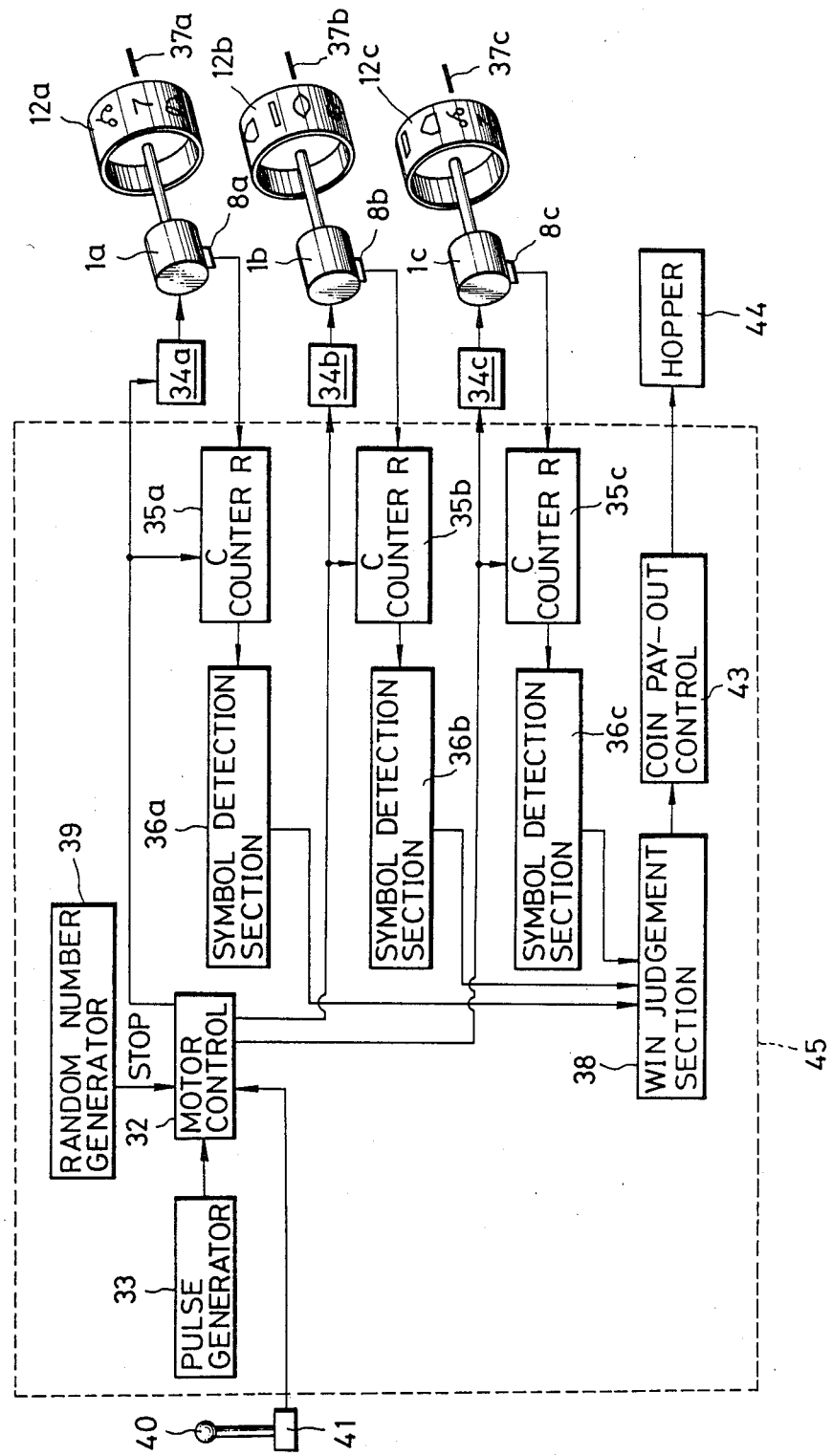
FIG. 2 is a block diagram showing a game circuit applied to a slot machine in which the stepping motor of FIG. 1 is incorporated.

The slot machine comprised by a set of reel assemblies having the stepping motors 1, the reel 12, and the counter 35 and the symbol detection section 36, all as described above, operates under the control of a system including a microcomputer 45 enclosed by a phantom line in FIG. 2. In FIG. 2, upon manipulating a start lever 40, a start pulse is produced by a manipulation detection section 41 and actuates the motor control section 32, and in turn clock pulses generated by the pulse generator 33 are supplied through the motor control section 32 to motor drive circuits 34a to 34c, thereby driving stepping motors 1a and 1c with driving pulses corresponding to the clock pulses supplied thereto. As a result, each reel 12a to 12c rotates. Since the clock pulses supplied to the motor drive circuits 34a to 34c are on the other hand cumulatively counted by respective counters 35a to 35c provided for each reel, the instantaneous position of each rotating reel corresponds to the value counted by the associated counter at any given moment.

Because of the construction of each stepping motor 1a to 1c shown in FIG. 1, each photointerrupter 8a to 8c produces a reset pulse every revolution. The reset pulses are supplied to and reset the respective counters 35a to 35c. As previously described, since the counted number of driving pulses in each counter 35a to 35c corresponds to the respective symbol arranged on each reel associated with the counter, it is possible to detect, based on the values counted by the counters 35a to 35c and by referring to the data memorized in the symbol detection sections 36 a to 36c, which symbols are displayed in the winning positions indicated by marks 37a to 37c.

When a certain time has elapsed after each stepping motor 1a to 5c has started to rotate, a random number generator 39 creates random numbers and causes the motor control section 32 to terminate the clock pulses supplied thereto from the pulse generator 33 so as to stop the stepping motors 1a to 1c in order corresponding to the random numbers supplied to the motor control section 32. At this time, symbols for respective reels 12a to 12c stopping in the winning positions indicated by the marks 37a to 37c are identified by the symbol detection sections 36a to 36c with reference to the numbers of clock pulses counted by the counters 35a to 35c. The symbols for respective reels which are transformed into a code signal are judged by a win judgment section 38 as to whether the three symbols on the reel in the winning positions correspond to any of the winning combinations of symbols; and if there is a win, the numbers of coins to be paid is determined according to the winning combination of symbols that has occurred. These decisions are performed with reference to a winning table included in the win judgment section 38. If in fact a win occurs, an appropriate number of coins are paid out by hopper 44 controlled by a coin payout control 43.

FIG. 3 shows another embodiment of the stepping motor according to the present invention which has a light-opaque disk 47 formed with a small hole 46, fixedly mounted on its rotary shaft 5 in place of the lug 6 of FIG. 1. The small hole 46 is detected by a photosensor 48 disposed in the housing 2 to provide a reset signal for the counter 35 every revolution of the light-opaque disk 47.

Although the foregoing description of the present invention is made with reference to a stepping motor in which a sensor is disposed inside the housing thereof, it will be apparent to those skilled in the art that a sensor can be disposed outside the housing of the stepping motor. This modification can be effected by providing means on the rotary shaft which is magnetically detected from the outside of the housing.

The present invention being described above, it will be obvious that the same may be varied in many ways. Such variations are not to be regarded as a departure from the spirit and scope of the present invention, and all such modifications are intended to be included within the scope of the following claims.

What is claimed is:

1. In a stepping motor comprising a rotary shaft, a rotor fixed to said rotary shaft, a stator within a housing, said rotor rotating within said stator, and means to supply driving pulses to said stepping motor; the improvement comprising signal activating means on said rotary shaft, and a sensor for detecting said signal activating means and adapted to produce a signal each revolution of said rotary shaft, said signal activating means and said sensor being disposed within said housing.

2. A stepping motor as defined in claim 1, wherein said signal serves as a signal for resetting to zero a counter which counts said driving pulses supplied by said supplying means.

3. A stepping motor as defined in claim 2, wherein said signal activating means comprises an opaque lug projecting from and rotatable with said rotary shaft and said sensor in a photosensor disposed inside said housing so as to detect the passage of said opaque lug.

4. A stepping motor as defined in claim 3, further comprising an inner barrel which is fitted inside said housing and by which said photosensor is attached to said housing.

5. A stepping motor as defined in claim 2, wherein said signal means comprises an opaque disk having a small eccentric hole therethrough which is fixedly attached to said rotary shaft, and said sensor is a photosensor disposed inside said housing so as to detect the passage of said small hole.

6. A stepping motor as defined in claim 5, further comprising an inner barrel which is fitted inside said housing and by which said photosensor is attached to said housing.

7. In the combination of a stepping motor comprising a rotary shaft, a rotor fixed to said rotary shaft, a stator within a housing, said rotor rotating within said stator, said rotary shaft having a free end that extends outside said housing, means to supply driving pulses to said stepping motor, and a reel having an annular series of various symbols of a slot machine disposed about the periphery of the reel; the improvement comprising signal activating means on said rotary shaft, a sensor for detecting said signal activating means and adapted to produce a signal each revolution of said rotary shaft, said signal activating means and said sensor being disposed within said housing, and indexing means on said reel for indicating a datum point along said annular series of various symbols, said reel being fixedly coupled to said free end of said rotary shaft so as to locate said indexing means in a predetermined position relative to said signal activating means.

8. A stepping motor assembly as defined in claim 7, wherein said signal activating means comprises an opaque member and said sensor is a photosensor disposed inside said housing so as to detect the passage of said opaque member.

9. A stepping motor assembly as defined in claim 8, further comprising an inner barrel which is fitted inside said housing and by which said photosensor is attached to said housing.

10. A stepping motor assembly as claimed in claim 7, said reel and said free end of said rotary shaft having non-circular interengaging means for accurately predetermining the position of said indexing means relative to said signal activating means.

* * * * *